United States Patent Office 3,255,257
Patented June 7, 1966

3,255,257
PREPARATION OF HYDROCARBON HALIDES
Gordon D. Brindell, Wayne, N.J., and David W. Marshall, Ponca City, Okla., assignors to Continental Oil Company, Ponca City, Okla., a corporation of Oklahoma
No Drawing. Filed Apr. 12, 1961, Ser. No. 102,406
6 Claims. (Cl. 260—632)

This invention relates to a method for the preparation of organo-halides. In one aspect, it relates to the preparation of organo-halides utilizing oxygen containing aluminum organic compounds whereby undesirable reactions and reaction products are substantially reduced.

It is well known in the art that halogen reacts readily with organometal compounds to form organo-halides. However, difficulties have been encountered in isolating the organo-halide from the reaction mixture so as to produce the organo-halogen commercially. One solution to this problem has been proposed in U.S. Patent No. 2,935,536, wherein it is stated that undesirable side reactions which occur in the halogenation process "can be checked or 'neutralized,' and the harmful effects of the metal halide on the organo-halide can be substantially eliminated by placing in the reaction medium a chemical which readily reacts to form a 'complex' with the metal halide as it is liberated in the reaction medium, but which will not react readily with the organometal or the organohalide, thus inhibiting the above-noted harmful effects of the metal-halide on the organo-halide." This patent discloses as complexing agents various amines and azines, and halo-derivatives thereof. While the process proposed by the patent appears to effectively accomplish the desired results, it would be of advantage to be able to produce the organic-halides without the use of a complexing agent, thereby eliminating the cost of this agent and also the expense involved in separating and recovering the complexing agent.

It is an object of this invention to provide an improved process for the preparation of organo-halides.

It is another object of this invention to provide an improved process for the preparation of organo-halides without the use of complexing agents.

Still another object of this invention is to provide an improved method for increasing yield in the preparation of organo-halides from metal hydrocarbon compounds.

Yet another object of this invention is to provide an improved process for the preparation of n-alkyl halides from alkoxymetal alkyls without the use of complexing agents.

The foregoing objects are achieved broadly by reacting an organooxymetal organo compound with a halogen and recovering organo-halide product.

In one aspect of the invention, the organo-halide product is recovered from the total reaction product by stripping, after which the remaining reaction product is hydrolyzed and alcohol recovered therefrom.

In another aspect of the invention, the total reaction product is hydrolyzed; and organo-halide product and alcohol product are recovered therefrom.

The organometal compounds which are employed in the process of this invention include broadly those represented by the formula:

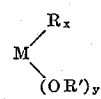

in which M is a metal selected from the group consisting of aluminum, antimony, bismuth, cadmium, copper, gallium, germanium, indium, lead, mercury, thallium, tin and zinc. R and R′ are organo-radicals, including all hydrocarbon and substituted hydrocarbon radicals capable of joining to a metal atom through a carbon atom of the organo-radical to form organometals, including alkyl, aryl, aralkyl, cycloalkyl, alkenyl, aralkenyl and cycloalkenyl hydrocarbon and substituted hydrocarbon radicals, $x+y=$ the valency of M and $y$ is at least about 10 percent of M. The preferred organo-compounds are the hydrocarbonoxyaluminum hydrocarbon compounds and more specifically the alkoxyaluminum alkyls, such as ethoxydiethylaluminum.

Specific illustrative reaction systems which can be employed in carrying out the method of the invention are the reaction of n-Octoxydi-n-octylaluminum and chlorine,
Di-n-octoxy-n-octylaluminum and bromine,
Isobutoxytri-isobutyltin and chlorine,
n-Hexoxydi-n-hexylaluminum and chlorine,
n-Hexoxydi-n-hexylaluminum and bromine,
Di-n-heptoxy-n-heptylaluminum and chlorine,
n-Decoxy-di-n-decylaluminum and iodine,
n-Dodecoxydi-n-dodecylaluminum and bromine,
n-Butoxytetra-n-butylantimony and chlorine,
Di-n-hexacosoxy-n-hexacosylaluminum and iodine,
Diethoxytriethylbismuth and bromine,
n-Hexacosoxydi-n-hexacosylaluminum and bromine,
Isoamoxy-isoamylcadmium and iodine,
n-Hexoxytri-n-hexylgermanium and bromine,
n-Tetracontoxydi-n-tetracontylaluminum and bromine,
Di-isobutoxy-di-isobutyllead and chlorine,
Hexoxyhexyl mercury and bromine,
Ethoxydiethylgallium and iodine,
Styroxydistyrlaluminum and chlorine,
Isobutoxydi-isobutylindium and chlorine,
Isobutoxydiisobutylantimony and bromine,
Phenoxydiphenylaluminum and bromine,
Cyclohexoxytricyclohexyltin and chlorine,
Isobutoxyisobutylzinc and chlorine, and the like.

As noted above in the organometal compounds, the organooxy group is at least about 10 percent and may vary up to as high as about 90 percent of the total valency of the metal constituent. The quantity of organohalide produce per mole of organometal compound is dependent, of course, on the value of $y$; and it is preferred that $y$ be not greater than about 60 percent of M to provide maximum production of the organo-halide product.

While any of the halogens can be employed for reaction with the organometal compound, chlorine is preferred.

The reaction is desirably carried out in the presence of a solvent for the organometal compound. Ordinarily a halogenated solvent is used, thereby precluding reaction of the halogen with the solvent. However, other solvents which are not readily halogenated can also be employed in carrying out the reaction.

The reaction is effected over a relatively wide range of temperature, the temperature being limited to maintain the organometal compound in solution, that is, below the boiling point of the particular solvent employed at the pressure on the reaction system. The reaction temperature is ordinarily in the range of between about −5° and +50° C. and preferably between about 25 and about 35° C.

As stated previously, the invention preferably is directed to the reaction of hydrocarbonoxyaluminum hydrocarbon compounds. The invention finds particular application in the use of complex mixtures of aluminum compounds which are obtained in the aluminum alkyl growth process. In this process, an aluminum alkyl such as triethylaluminum is reacted with low molecular weight olefins such as ethylene to form a "growth" product, said product comprising trialkylaluminum compounds in which the alkyl groups vary widely in molecular weight. The growth reaction can be illustrated by an equation as follows:

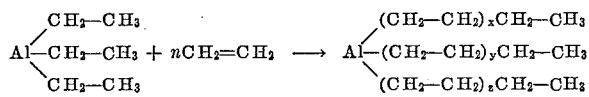

wherein $x$, $y$ and $z$ represent integers ranging from 0 to about 14 and $x+y+z=n$. The growth reaction is carried out by passing ethylene through triethylaluminum, preferably in the presence of a diluent under a wide variety of reaction conditions, for example, 65 to 150° C. and 200 to 5,000 p.s.i.g., preferably 90 to 120° C. and 1,000 to 3,500 p.s.i.g. Although triethylaluminum is the preferred reactant, other low molecular weight aluminum alkyls, such as tripropylaluminum, tributylaluminum, triisobutylaluminum, di-ethylaluminum hydride, ethylaluminum dihydride, etc., can be employed and other low molecular weight aliphatic alpha-olefins, such as propylene, butene, and the like can be substituted in lieu of ethylene.

It has been found that the growth reaction provides a statistical distribution of alkyl chain lengths characterized by the Poisson relationship, which can be expressed as follows:

$$P_{(n)} = \frac{m^n e^{-m}}{n!}$$

wherein $P_{(n)}$ represents the probability that a certain hydrocarbon radical will be formed by $n$ additions of ethylene to the aluminum-ethyl bond originally present and $m$ is the mean number of additions of ethylene per growing chain. An example of the type of distribution which is obtained in the growth reaction is presented in the following table:

TABLE

| Alkyl group: | Weight percent |
|---|---|
| $C_2$ | 0.04 |
| $C_4$ | 0.23 |
| $C_6$ | 3.37 |
| $C_8$ | 11.79 |
| $C_{10}$ | 20.42 |
| $C_{12}$ | 22.63 |
| $C_{14}$ | 18.20 |
| $C_{16}$ | 11.61 |
| $C_{18}$ | 6.21 |
| $C_{20}$ | 3.47 |
| $C_{22}$ | 1.25 |
| $C_{24}$ | 0.49 |
| $C_{26}$ | 0.18 |
| $C_{28}$ | 0.05 |

The growth product is reacted with oxygen (air) usually at a temperature from about 20 to about 100° C., and a pressure from about 10 to 60 p.s.i.g. whereby alkyl groups are converted to alkoxides. The degree of oxidation, that is, the percentage of alkyl groups which are oxidized, can be readily controlled by the use of appropriate temperatures, pressures, and reaction time. The alkoxy-aluminum alkyls which result from the oxidation process or any portion or fractions thereof provide a preferred reactant in the process of this invention.

Following the halogenation reaction, organo-chloride product is recovered from the other reaction products, usually by fractional distillation. The remainder of the reaction product can be hydrolyzed to provide alcohols, and the metal oxide or hydroxide. Separation and recovery of the organo-halide can be effected before or after hydrolysis as desired. Any of the conventional hydrolyzing agents can be employed in the hydrolysis step, such as, water, acids, bases, etc. Usually dilute halogen acids are preferred, the halogen portion of the acid corresponding to the halogen used in the reaction with the organometal compounds.

The following examples are presented in illustration of the invention:

*Example 1*

The compound of the type $(C_8H_{17}O)_yAl(C_8H_{17})_x$ was prepared by reacting the aluminum alkyl with the corresponding alcohol. Gas chromatographic (GLPC) analysis of the hydrolyzed product indicated the alkoxy groups to be 55.1 percent of the compound and the alkyl groups 44.7 percent.

150 ml. of $CaH_2$ dried o-dichlorobenzene was placed in a 150-ml. flask containing a magnetic stirring bar. The flask was then flushed with $N_2$, and 26 grams of the alkoxyaluminum alkyl was added to the o-dichlorobenzene with a pressure equalized dropping funnel. No temperature effect was noted. Chlorine was passed through an $H_2SO_4$ drying system and into the stirred solution using a frit.

The temperature immediately rose but was kept to 25 to 35° C. by means of a hexane-Dry Ice bath. After approximately 3 hours, an excess of $Cl_2$ had been added. The $Cl_2$ addition was stopped, and the reaction mixture was allowed to stand overnight. A sample of the reaction mixture was hydrolyzed using dilute HCl, the hydrocarbon layer dried over anhydrous $Na_2SO_4$, and the layer run on an Apiezon GLPC column. Analysis indicated that 73 percent of the available octyl groups had been converted to n-octyl chloride, the alkoxy groups being recovered as n-octyl alcohol.

*Example 2*

The compound of the type $(C_6H_{13}O)_yAl(C_6H_{13})_x$ was prepared by reacting the aluminum alkyl with the corresponding alcohol. GLPC analysis of the hydrolyzed product indicated alkyl groups comprising 69 percent of the compound with alkoxide groups making up 31 percent.

The procedure used was that employed in Example 1. 150 ml. of o-dichlorobenzene and 0.04 mole of the alkoxyaluminum alkyl were employed. GLPC analysis of the hydrolyzed reaction product indicated 83.65 percent of the available hexyl groups were converted to n-hexyl chloride, alkoxide groups being recovered as the alcohol.

*Example 3*

Additional runs were carried out following the general procedure and under the conditions employed in Examples 1 and 2. The results of these runs are presented in Table 1.

TABLE I

| Run No. | Aluminum Alkoxy Alkyl | Percent Alkoxy Equivalents [1] | Percent Alkyl Equivalents [1] | Solvent | Temperature, °C. | Yield Alkyl Cl percent [1] |
|---|---|---|---|---|---|---|
| 1 | Al(OC$_8$H$_{17}$)$_2$(C$_8$H$_{17}$) | 60 | 40 | Carbon tetrachloride | 15–35 | 53.1 |
| 2 | Al(OC$_6$H$_{13}$)(C$_6$H$_{13}$)$_2$ | 31 | 69 | ⎯⎯do⎯⎯ | 15–35 | 64.5 |
| 3 | Al(OC$_6$H$_{13}$)$_2$(C$_6$H$_{13}$) | 70 | 30 | ⎯⎯do⎯⎯ | 15–35 | 61.39 |
| 4 | Growth Product [2] | 51 | 49 | o-Dichloro-benzene | 15–35 | 61.0 |

[1] Based on GLPC analysis of hydrolyzed material.
[2] The growth product (aluminum trialkyl) was prepared by reacting aluminum triethyl in isooctane with ethylene at about 1,500 p.s.i.g. and about 117° C. for a period of 2½ hours, the product being a mixture of aluminum trialkyls having an $m$ value of 3.3. Prior to halogenation, the growth product was stripped to remove solvent and olefins.

Having thus described the invention by providing specific examples thereof, it is to be understood that no undue limitations or restrictions are to be drawn by reason thereof and that many variations and modifications are within the scope of the invention.

We claim:

1. A process for the preparation of organo-halides which comprises reacting a compound having the formula:

in which M is a metal selected from the group consisting of aluminum, antimony, bismuth, cadmium, copper, gallium, germanium, indium, lead, mercury, thallium, tin and zinc, R and R' are hydrocarbon radicals having from 2 to 30 carbon atoms, $x+y=$ the valency of M and $y$ is from 10 percent to 90 percent of M, with a halogen element selected from the class consisting of chlorine, bromine and iodine at a temperature between about −5 and about 50° C. to form a mixture of organooxymetal halides and organo-halides, hydrolyzing said mixture and recovering therefrom organo-halide product and alcohol product.

2. A process for the preparation of organo-halides which comprises reacting a compound having the formula:

in which M is a metal selected from the group consisting of aluminum, antimony, bismuth, cadmium, copper, gallium, germanium, indium, lead, mercury, thallium, tin and zinc, R and R' are organo-radicals selected from the group consisting of hydrocarbon radicals having from 2 to 30 carbon atoms, $x+y=$ the valency of M and $y$ is from 10 percent to 90 percent of M, with a halogen element selected from the class consisting of chlorine, bromine and iodine at a temperature between about −5 and about 50° C. to form a mixture of organooxymetal halides and organo-halides, stripping organo-halides from the reaction product, hydrolyzing the organo-oxymetal halides and recovering alcohol product.

3. A process for the preparation of n-alkyl halides which comprises reacting at least one alkoxyaluminum alkyl having from 2 to 30 carbon atoms in solution in a halogenated solvent with a halogen element selected from the class consisting of chlorine, bromine and iodine at a temperature between about −5 and about 50° C. to form a mixture of alkoxymetal halides and n-alkyl halides, hydrolyzing said mixture and recovering therefrom n-alkyl halide product and alcohol product.

4. A process for the preparation of n-alkyl halides which comprises reacting at least one alkoxyaluminum alkyl whose alkoxy and alkyl groups contain from 2 to 30 carbon atoms in solution in a halogenated solvent with a halogen element selected from the class consisting of chlorine, bromine and iodine at a temperature between about −5 and about 50° C. to form a mixture of alkoxymetal halides and n-alkyl halides, stripping n-alkyl halides from the reaction product, hydrolyzing the alkoxymetal halides and recovering alcohol product.

5. A process for the preparation of n-alkyl halides which comprises reacting at least one alkoxyaluminum alkyl whose alkoxy and alkyl groups contain from 2 to 30 carbon atoms in solution in a halogenated solvent with a halogen element selected from the class consisting of chlorine, bromine and iodine at a temperature between about −5 and about 50° C. to form a mixture of aluminum alkoxy halides and n-alkyl halides and recovering n-alkyl halide product.

6. A process for the preparation of n-alkyl halides which comprises reacting at least one alkoxyaluminum n-alkyl whose alkoxy and alkyl groups contain from 2 to 30 carbon atoms with a halogen element selected from the class consisting of chlorine, bromine and iodine at a temperature between about −5 and about 50° C. to form a mixture of alkoxyaluminum halides and n-alkyl halides and recovering n-alkyl halide product.

References Cited by the Examiner

UNITED STATES PATENTS 3,048,612    8/1962    Walde _____ 260—632

OTHER REFERENCES

Ladenburg, Ber., 3 (1870), page 357.

LEON ZITVER, *Primary Examiner.*